US009571578B1

United States Patent
Andre et al.

(10) Patent No.: US 9,571,578 B1
(45) Date of Patent: *Feb. 14, 2017

(54) UTILIZATION BASED MULTI-BUFFER SELF-CALIBRATED DYNAMIC ADJUSTMENT MANAGEMENT

(71) Applicant: INTERNATIONAL BUSINESS MACHINES CORPORATION, Armonk, NY (US)

(72) Inventors: Herve G. P. Andre, Orlando, FL (US); Trung N. Nguyen, Tucson, AZ (US); Juan J. Ruiz, Daly City, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/947,521

(22) Filed: Nov. 20, 2015

(51) Int. Cl.
| | |
|---|---|
| *G06F 3/00* | (2006.01) |
| *G06F 15/16* | (2006.01) |
| *H04L 29/08* | (2006.01) |
| *H04L 12/26* | (2006.01) |
| *G06F 12/08* | (2016.01) |
| *H04L 12/835* | (2013.01) |

(52) U.S. Cl.
CPC ....... *H04L 67/1097* (2013.01); *G06F 12/0895* (2013.01); *H04L 43/0882* (2013.01); *H04L 47/30* (2013.01)

(58) Field of Classification Search
CPC .............................. G06F 9/526; G06F 9/4843
USPC .............................................. 709/217; 710/29
See application file for complete search history.

(56) References Cited

U.S. PATENT DOCUMENTS

| | | | |
|---|---|---|---|
| 6,094,712 A | 7/2000 | Follett et al. | |
| 6,757,273 B1 | 6/2004 | Hsu et al. | |
| 6,845,430 B2 | 1/2005 | Hopeman et al. | |
| 6,862,635 B1 * | 3/2005 | Alverson ................. | G06F 9/52 709/213 |
| 7,146,458 B2 | 12/2006 | Smirnov et al. | |
| 7,528,838 B2 | 5/2009 | Gosalia et al. | |
| 8,904,067 B2 | 12/2014 | Saputra | |
| 8,929,213 B2 | 1/2015 | Chrysos et al. | |
| 9,003,131 B1 | 4/2015 | Lunev | |
| 9,026,735 B1 | 5/2015 | Torok et al. | |

(Continued)

FOREIGN PATENT DOCUMENTS

EP  2593861 A1  5/2013

OTHER PUBLICATIONS

List of IBM Patents or Patent Applications Treated as Related, dated Nov. 20, 2015, pp. 2.

(Continued)

*Primary Examiner* — Aftab N. Khan
(74) *Attorney, Agent, or Firm* — Janaki K. Davda; Konrad Raynes Davda & Victor LLP

(57) ABSTRACT

Provided are techniques for utilization based multi-buffer self-calibrated dynamic adjustment management. A sub-buffer is assigned to each entity of multiple entities. Under control of each of the multiple entities, a current utilization rate of the entity and each other entity is summed up; a number of data segments for the entity are determined based on the current utilization rate of the entity relative to the current utilization rate of each of the other entities; and a size of the assigned sub-buffer is adjusted based on the determination.

20 Claims, 16 Drawing Sheets

(56) References Cited

U.S. PATENT DOCUMENTS

| | | | |
|---|---|---|---|
| 9,055,009 | B2 | 6/2015 | Chrysos et al. |
| 9,197,686 | B1 | 11/2015 | Kirkby et al. |
| 9,286,328 | B2 | 3/2016 | Kozin et al. |
| 2004/0004970 | A1 | 1/2004 | Lakshmanamurthy et al. |
| 2006/0225078 | A1* | 10/2006 | Anderson ............... G06F 9/526 718/104 |
| 2007/0140122 | A1 | 6/2007 | Murthy |
| 2010/0153634 | A1* | 6/2010 | Fellinger ............... G06F 3/0611 711/104 |
| 2010/0323742 | A1* | 12/2010 | Allen ................. H04W 76/005 455/519 |
| 2010/0332755 | A1 | 12/2010 | Bu et al. |
| 2012/0017214 | A1 | 1/2012 | Shannon et al. |
| 2013/0051478 | A1 | 2/2013 | Wu et al. |
| 2013/0077491 | A1* | 3/2013 | Cherian ................. H04L 69/22 370/235 |
| 2013/0246775 | A1 | 9/2013 | Bradbury et al. |
| 2014/0181794 | A1 | 6/2014 | Grawrock et al. |
| 2014/0282454 | A1 | 9/2014 | Bai et al. |
| 2015/0039840 | A1 | 2/2015 | Chandra et al. |
| 2015/0370717 | A1 | 12/2015 | Godard et al. |

OTHER PUBLICATIONS

U.S. Appl. No. 14/947,686, filed Nov. 20, 2015.
U.S. Appl. No. 14/947,734, filed Nov. 20, 2015.
U.S. Appl. No. 14/947,468, filed Nov. 20, 2015.
Office Action dated Mar. 31, 2016, pp. 13, for U.S. Appl. No. 14/947,468, filed Nov. 20, 2015.
Response dated Jun. 30, 2015, pp. 12, to Office Action dated Mar. 31, 2016, pp. 13, for U.S. Appl. No. 14/947,468, filed Nov. 20, 2015.
Response dated Jul. 12, 2016, pp. 12, to Office Action dated May 6, 2016, pp. 26, for U.S. Appl. No. 14/947,686, filed Nov. 20, 2015.
Notice of Allowance dated Jul. 15, 2016, pp. 15, for U.S. Appl. No. 14/947,468, filed Nov. 20, 2015.
Office Action dated May 6, 2016, pp. 26, for U.S. Appl. No. 14/947,686, filed Nov. 20, 2015.
Notice of Allowance dated Apr. 19, 2016, pp. 16, for U.S. Appl. No. 14/947,734, filed Nov. 20, 2015.
Notice of Allowance dated May 31, 2016, pp. 8, for U.S. Appl. No. 14/947,734, filed Nov. 20, 2015.
List of Patents or Patent Applications Treated as Related, dated Oct. 17, 2016, pp. 2.
U.S. Appl. No. 15/240,856, filed Aug. 18, 2016.
Preliminary Amendment dated Aug. 18, 2016, pp. 7, for U.S. Appl. No. 15/240,856, filed Aug. 18, 2016.
Final Office Action dated Oct. 24, 2016, pp. 24, for U.S. Appl. No. 14/947,686, filed Nov. 20, 2015.
Office Action dated Nov. 18, 2016, pp. 12, for U.S. Appl. No. 15/240,856, filed Aug. 18, 2016.

* cited by examiner

UTILIZATION BASED MULTI-BUFFER SELF-CALIBRATED DYNAMIC ADJUSTMENT MANAGEMENT

FIELD

Embodiments of the invention relate to utilization based multi-buffer self-calibrated dynamic adjustment management.

BACKGROUND

A circular buffer may be described as any buffer which its one or more users consumes starting from a beginning location, continuing in a fixed order, and going back to the beginning location after reaching the end. For example, a circular buffer may be created with a linked list of data segments (memory segments or segments) or linear buffers that are used to form a ring.

Sometimes different users share a circular buffer. Users may be any type of consumer for the circular buffer, such as threads and processes. When accessing a shared circular buffer (as may be the case for tracing program code), a lock is obtained to prevent users from stepping over each other and rendering the data in the circular buffer incoherent. On the performance path, obtaining a lock may be problematic in an environment in which the number of threads accessing such a lock may be large (e.g., in the hundreds). Even if a small percentage of those threads compete for that lock, there may be a lot of time spent waiting and not accomplishing critical tasks. A thread may be described as the smallest sequence of programmed instructions that may be managed independently by a scheduler, which is typically a part of the operating system.

In some conventional systems, a task performed while the lock is held is optimized to just what is critical (e.g., just claiming an amount of space currently needed and not using that space until after the lock has been relinquished). This may improve performance, but, when a lot of threads are competing for that lock, there is a great likelihood of threads starving and critical tasks being stalled.

In some conventional systems, the circular buffer is split into as many circular sub-buffers as there are threads. Then, each thread uses its own sub-buffer. In this case, no lock is required, but significant skews in the consumption amongst the threads may lead to inefficient utilization of the total circular buffer. For example, some sub-buffers may wrap often, while other sub-buffers remain virtually empty.

In some conventional systems, a midway solution is to put the threads into small groups and divide the total circular buffer into as many sub-buffers as there are groups. The threads in each group use the associated sub-buffer, and each group of threads handles its own private lock, which reduces lock contention. If the threads are properly aggregated to groups, their cumulative production may offer smaller skews between groups, thus a better distribution in buffer utilization. While this technique may decrease the inefficiency in buffer utilization by averaging the group's individual threads' productions, having a "one size fits all" sub-buffer for each group of diversified threads with individually unpredictable production rate may still result in temporally localized inefficiencies. There will still be ebb and flow in utilization at the group level, thus creating skews.

SUMMARY

Provided is a computer program product for utilization based multi-buffer self-calibrated dynamic adjustment management. The computer program product comprises a computer readable storage medium having program code embodied therewith, the program code executable by at least one processor to perform operations, the operations comprising: assigning a sub-buffer to each entity of multiple entities; and, under control of each of the multiple entities, summing up a current utilization rate of the entity and each other entity, determining a number of data segments for the entity based on the current utilization rate of the entity relative to the current utilization rate of each of the other entities, and adjusting a size of the assigned sub-buffer based on the determination.

Provided is a computer system for utilization based multi-buffer self-calibrated dynamic adjustment management. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations, the operations comprising: assigning a sub-buffer to each entity of multiple entities; and, under control of each of the multiple entities, summing up a current utilization rate of the entity and each other entity, determining a number of data segments for the entity based on the current utilization rate of the entity relative to the current utilization rate of each of the other entities, and adjusting a size of the assigned sub-buffer based on the determination.

Provided is a method for utilization based multi-buffer self-calibrated dynamic adjustment management. The method comprising: assigning, with a processor of a computer, a sub-buffer to each entity of multiple entities; and, under control of each of the multiple entities, summing up a current utilization rate of the entity and each other entity, determining a number of data segments for the entity based on the current utilization rate of the entity relative to the current utilization rate of each of the other entities, and adjusting a size of the assigned sub-buffer based on the determination.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide shared buffer management and utilization in a computing device with a high performance requirement.

Figure 1:
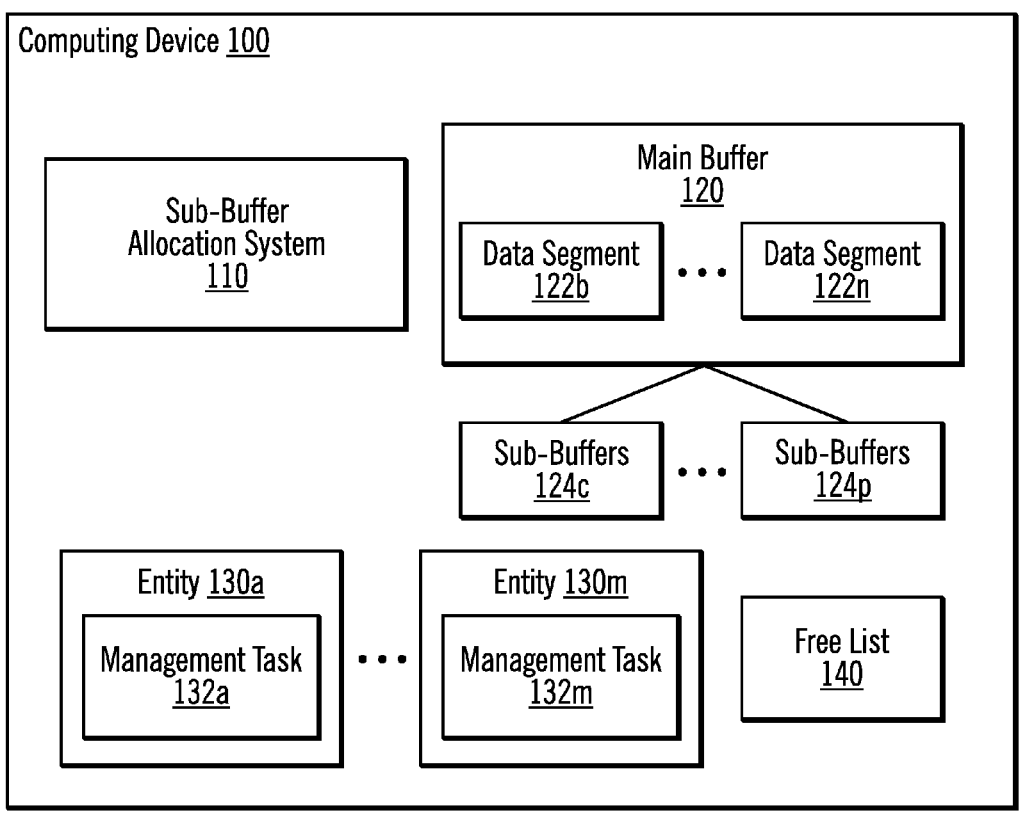
FIG. 1 illustrates, in a block diagram, a computing environment in accordance with certain embodiments.

FIG. 1 illustrates, in a block diagram, a computing environment in accordance with certain embodiments. In FIG. 1, a computing device 100 includes a sub-buffer allocation system 110, at least one main buffer 120, entities 130a . . . 130m (where the ellipses and the use of "a" and "m" indicate that there may be any number of entities in various embodiments), and a free list 140. Each entity 130a . . . 130m includes a management task 132a . . . 132m.

The main buffer 120 has data segments 122b . . . 122n (where the ellipses and the use of "b" and "n" indicate that there may be any number of data segments in various embodiments). With embodiments, the main buffer 120 is divided into sub-buffers 124c . . . 124p (where the ellipses and the use of "c" and "p" indicate that there may be any number of sub-buffers in various embodiments) whose size is adaptively changed based on utilization. Each of the sub-buffers 124c . . . 124p is assigned one or more of the data segments 122b . . . 122n. In certain embodiments, the main buffer 120 is composed of data segments that are picked at random to form sub-buffers. With embodiments, the main buffer 120 describes a total amount of space allocated to handle tracing. For example, this total amount of space may be divided into equal sized data segments, and the data segments are used to form sub-buffers. The sub-buffers are utilized as circular buffers. For example, the data segments within a sub-buffer are listed in a closed chain (a ring).

An entity may be any user of the sub-buffers. In certain embodiments, an entity is a group of threads (which may be grouped using certain criteria), and a sub-buffer is assigned to the group of threads. In certain other embodiments, an entity is an individual thread, and the sub-buffer is assigned to the individual thread. In certain other embodiments, an entity is an individual process, and the sub-buffer is assigned to the individual process. In further embodiments, the entity is a group of processes, and the sub-buffer is assigned to the group of processes. The group of processes may be grouped using certain criteria (e.g., performing certain tasks, running on certain subset of processors, etc.). If an entity 130a . . . 130m is a group of threads or processes, one or more threads or the processes of the group may include the management task 132a . . . 132m.

In certain embodiments, the free list is a First In First Out (FIFO) list. The FIFO list allows least recently freed/used data segments to be integrated into sub-buffers; that way, when trace data is collected and sorted, the traces tend to be more closely (temporally) related.

Embodiments provide sub-buffers with utilization based adaptive size, which eliminates many inefficiencies of other systems. Such a solution enables calculation of the relative production of each entity and reassigns buffer space (i.e., shrinks or grows individual sub-buffers) as needed. In certain embodiments, each entity consuming the buffer space performs this management task.

With embodiments, there are multiple entities that share the main buffer 120 that is divided into non-equal sized sub-buffers, and each management task 132a . . . 132n grows and shrinks the sub-buffers on a utilization basis (i.e., based on how much each of the sub-buffers is being used). With embodiments, the total size of the sub-buffers is the size of the main buffer.

With embodiments,

Let Buffer (B) be a total main buffer available.

Let Sub-Buffer (SBx, where x is an integer) correspond to the sub-buffer allocated to "entity x" (Ex).

Let the main buffer and the sub-buffers be comprised of fixed sized data segments. However, in alternative embodiments, the buffers are not segmented, but, segmenting the buffers makes them easier to manage in certain situations. With embodiments, the main buffer is the total space available, and the main buffer is divided in equally sized data segments of memory. Those data segments are picked at random to form sub-buffers. So the sub-buffers are subsets of the main buffer; thus, the main buffer and the sub-buffers are comprised (conceptually) of one-sized segments. The sub-buffers are in effect a data structure, an ordered list (linked list) of data segments. The data segments within the sub-buffer are used in order and, as one data segment gets used up, the user moves to the linked data segment that follows the used one.

Let each entity Ex utilize its allocated sub-buffer SBx in a circular fashion (i.e., when the entity reaches the end of its sub-buffer, the entity will go back to the beginning of the sub-buffer to continue its utilization).

The management task changes the size of a sub-buffer SBx proportionately to the corresponding entity's (Ex's) utilization (Ux) relative to the sum of utilizations by all the entities (E1 through En). With embodiments, the value of the utilization Ux and the size change of the sub-buffer SBx is determined by the entity Ex itself.

Figure 4:
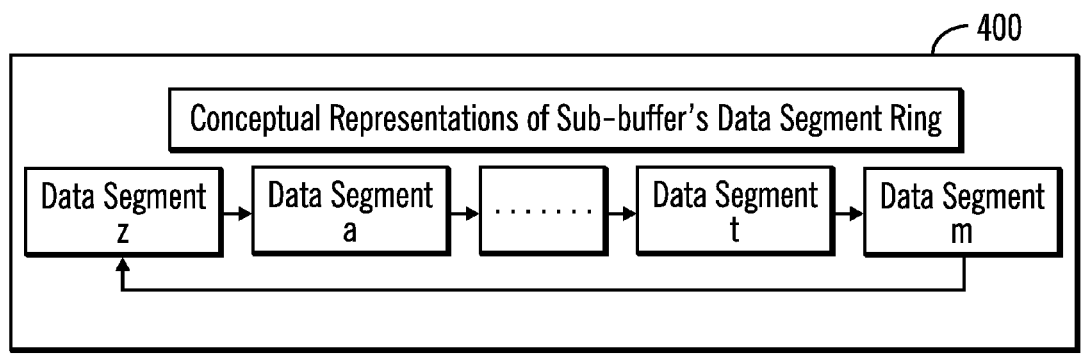
FIG. 4 illustrates a conceptual representation of a sub-buffer's data segment ring in accordance with certain embodiments.
Figure 5:
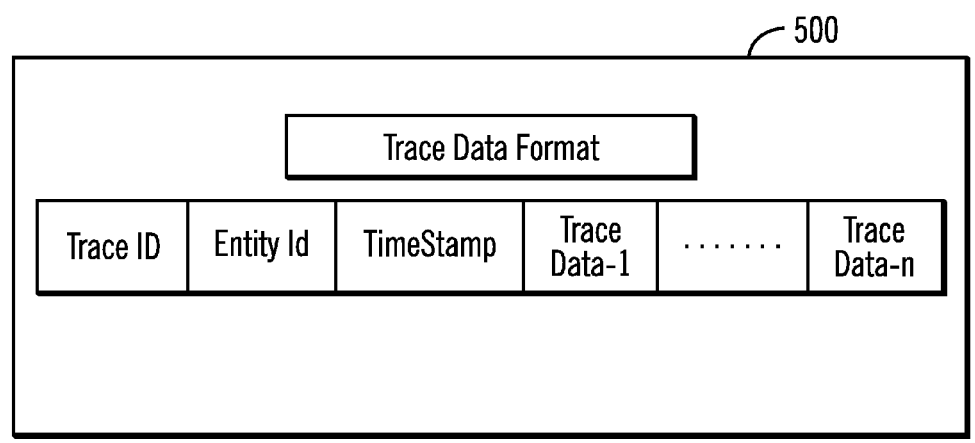
FIG. 5 illustrates a trace data format in accordance with certain embodiments.
Figure 6:
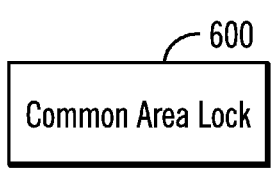
FIG. 6 illustrates a common area lock in accordance with certain embodiments.
Figure 7:
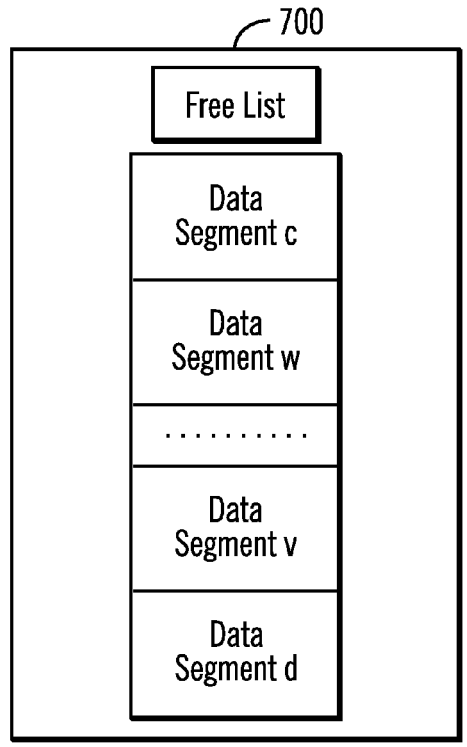
FIG. 7 illustrates a free list of data segments in accordance with certain embodiments.
Figure 8:
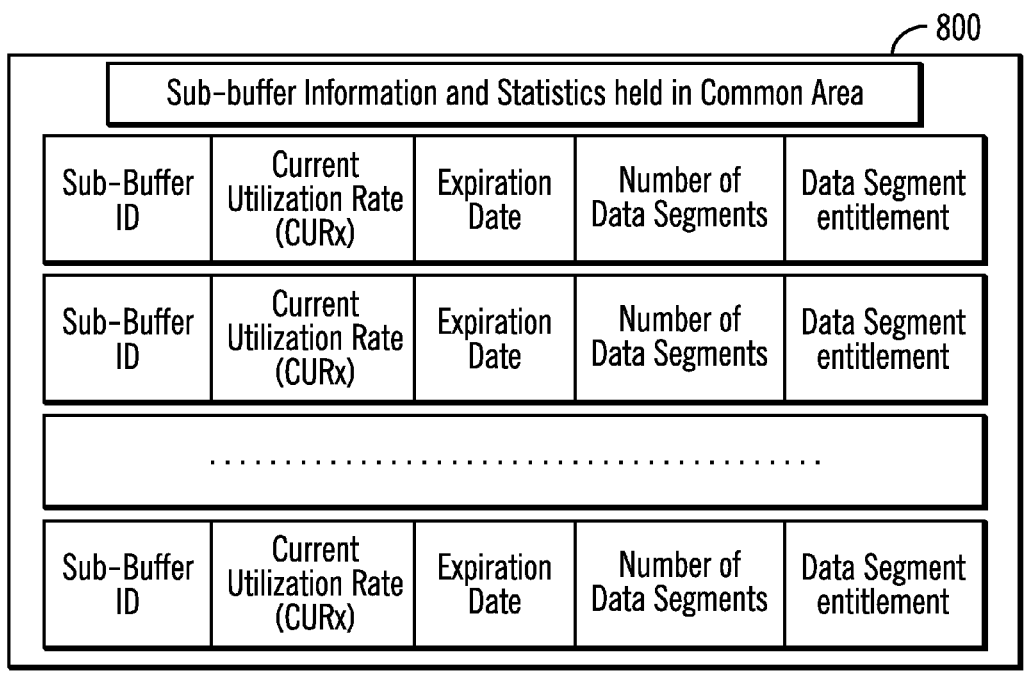
FIG. 8 illustrates sub-buffer information and statistics held in a common area in accordance with certain embodiments.

FIGS. 2, 3, 4, and 5 illustrate control structures and representations, while FIGS. 6, 7, and 8 illustrate common area structures.

Figure 2:
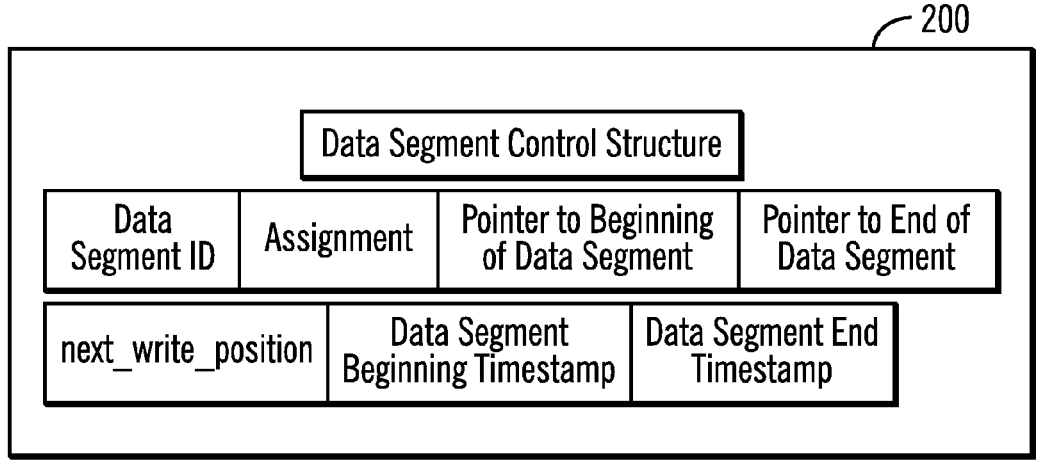
FIG. 2 illustrates a data segment control structure in accordance with certain embodiments.

FIG. 2 illustrates a data segment control structure 200 in accordance with certain embodiments. The data segment control structure 200 includes a data segment identifier (ID), an assignment, a pointer to the beginning of a data segment, a pointer to the end of the data segment, a next_write_position (indicating where data (e.g., trace data) should be written next), a data segment beginning timestamp, and a data segment end timestamp.

Figure 3:
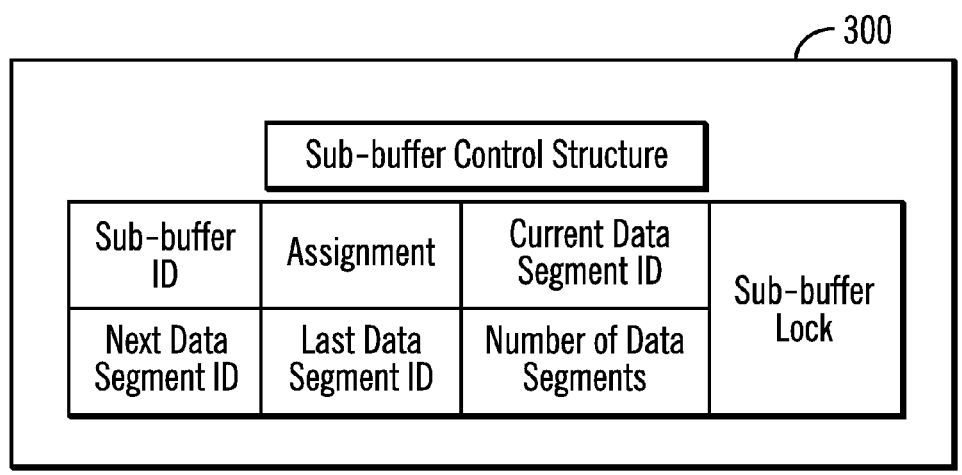
FIG. 3 illustrates a sub-buffer control structure in accordance with certain embodiments.

FIG. 3 illustrates a sub-buffer control structure 300 in accordance with certain embodiments. The sub-buffer control structure 300 includes a sub-buffer ID, an assignment, a current data segment ID, a sub-buffer lock, a next segment data segment ID, a last data segment ID, and a number of data segments.

FIG. 4 illustrates a conceptual representation of a sub-buffer's data segment ring in accordance with certain embodiments. In FIG. 4, the data segment ring is formed by data segment z, data segment a, ellipses representing additional data segments, data segment t, and data segment m. If data segment z is the current data segment, then data segment a is the next data segment, and data segment m is the last data segment. As the data segments get used up, what used to be the current data segment becomes the last data segment, what used to be the next data segment becomes the current data segment, and the data segment after the current data segment becomes the next data segment.

FIG. 5 illustrates a trace data format 500 in accordance with certain embodiments. The trace data format 500 includes a trace ID, an entity ID, a timestamp, and trace data-1 . . . trace data-n (where the ellipses represent additional trace data). Although examples and embodiments may reference traces or trace data, embodiments of the invention are not limited to traces or trace data.

FIG. 6 illustrates a common area lock 600 in accordance with certain embodiments. Each of the entities obtains the common area lock 600 before accessing any common area structure.

FIG. 7 illustrates a free list of data segments 700 in accordance with certain embodiments. In FIG. 7, the free list of data segments 700 includes data segment c, data segment w, ellipses representing additional data segments, data segment v, and data segment d.

FIG. 8 illustrates sub-buffer information and statistics 800 held in a common area in accordance with certain embodiments. The sub-buffer information and statistics 800 include, for each sub-buffer ID, a current utilization rate (CURx), an expiration date, a number of data segments, and data segment entitlement.

Figure 9:
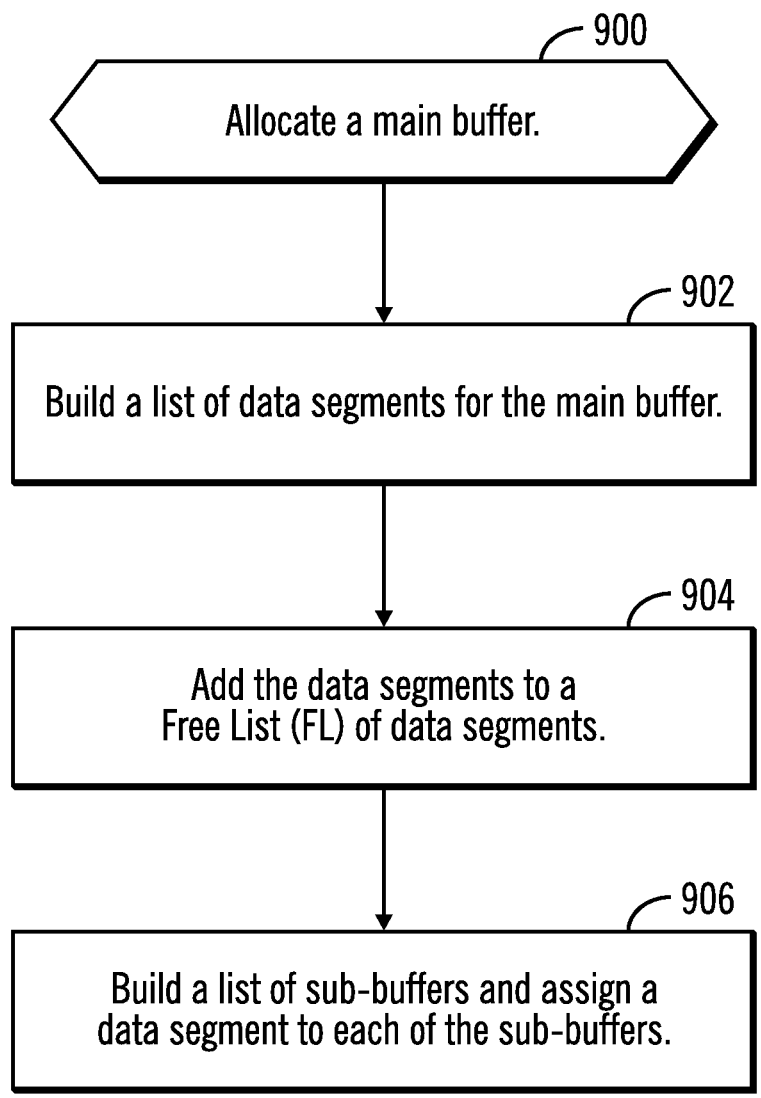
FIG. 9 illustrates, in a flowchart, operations performed for initialization in accordance with certain embodiments.

FIG. 9 illustrates, in a flowchart, operations performed for initialization in accordance with certain embodiments. Control begins at block 900 with the sub-buffer allocation system 110 allocating a main buffer. In block 902, the sub-buffer allocation system 110 builds a list of data segments for the main buffer. This may include dividing a main buffer B into Z data segments.

In certain embodiments, Z is a factor of 100 and the number of entities (N), and is at least 2 times greater than N. Merely to enhance understanding, an example is provided herein. Let Z represent the total number of data segments in the main buffer; and let N be the number of entities. Embodiments write the following equations:

$$Z=100*F \text{ (where } F \text{ is an integer)}$$

$$Z=J*N \text{ (where } J \text{ is an integer greater than 2)}$$

So, let N=1 k (1000), then, valid values for Z are 2 k, 3 k, 4 k, . . . etc.

With embodiments, once the percentage utilization is rounded to the nearest whole value, the number of data segments to which an entity is entitled will also be a whole number.

In block 904, the sub-buffer allocation system 110 adds the data segments to a free list (FL) of data segments. In block 906, the sub-buffer allocation system 110 builds a list of sub-buffers and assign a data segment to each of the sub-buffers. This is done at the beginning of operations (e.g., time zero). At this time, the utilization of each entity is unknown, and the sub-buffer allocation system 110 avoids overprovisioning the size of the sub-buffers. As the utilization becomes known, the management task may add more data segments or remove data segments from each sub-buffer SBx.

In certain embodiments, to help prevent resonance (having to move segments back and forth in and out of sub-buffers because of over-provisioning or under-provisioning due to use of past performance as a predictor of future need), the entity Ex is less aggressive in the data segment movements than is suggested by utilization Ux. For example, when incrementing the size of the sub-buffer SBx, the corresponding entity Ex takes one data segment from the free list (if available), including at time zero, and assigns the data segment to the sub-buffer. As another example, when decrementing the size of the sub-buffer SBx, the corresponding entity Ex removes one data segment less than what the utilization Ux suggests. With other embodiments, this "one at a time" and "one less than suggested" technique may be recalibrated to better fit the specific implementation's circumstances.

For every current data segment within the sub-buffer SBx that an entity Ex is using, the entity keeps track of the following statistics:
 a timestamp of when the entity Ex first started utilizing the data segment (Data Segment Begin Timestamp);
 a timestamp of when the entity Ex reaches the end of the data segment (Data Segment End Timestamp); and
 an expiration time of the validity of the statistics above (Expiration Date). In certain embodiments, the viability life span value may be made constant for all.

Figure 10:
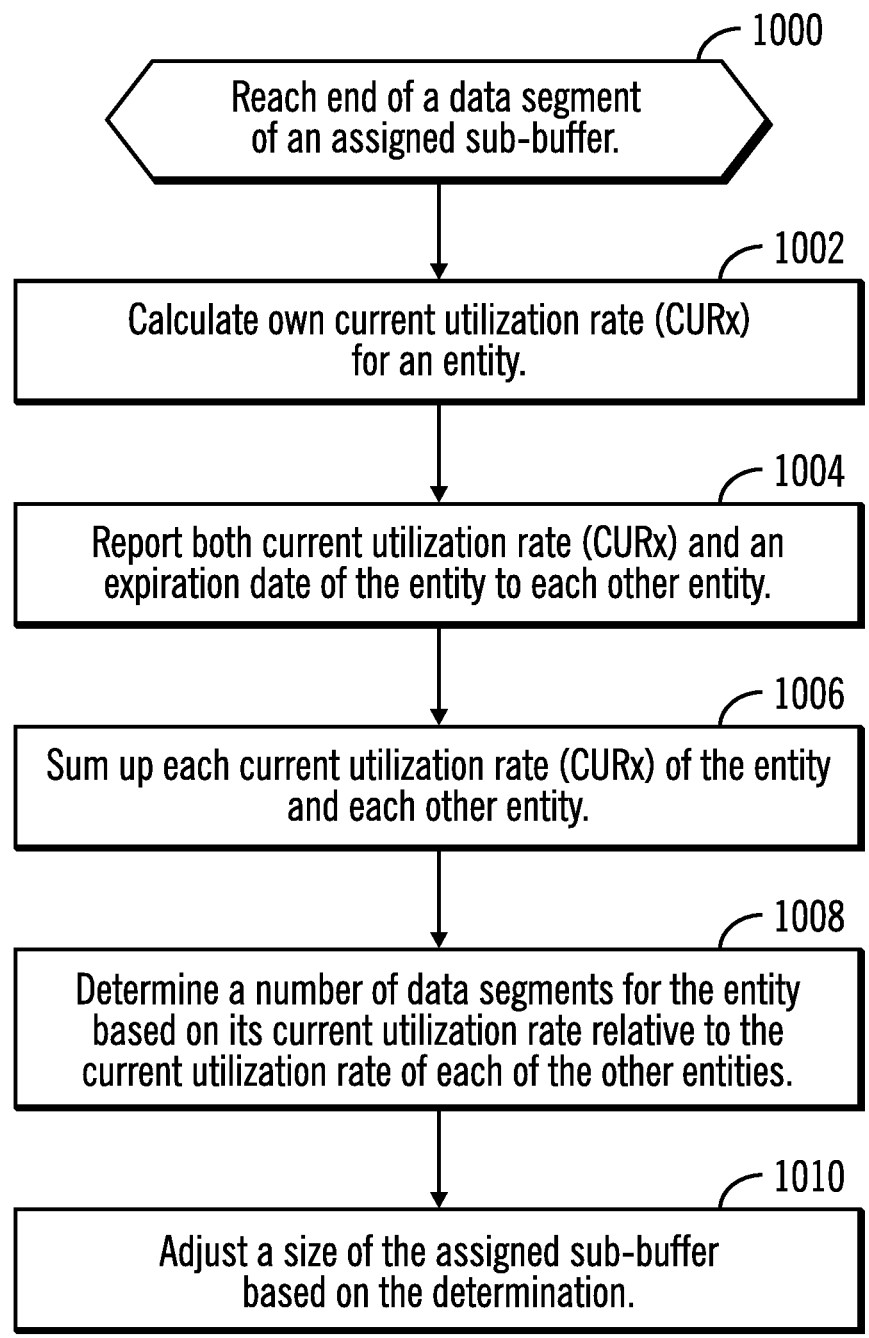
FIG. 10 illustrates, in a flowchart, operations performed by an entity to re-size its sub-buffer in accordance with certain embodiments.

FIG. 10 illustrates, in a flowchart, operations performed by an entity to re-size its sub-buffer in accordance with certain embodiments. Each entity performs the processing of FIG. 10. Control begins at block 1000 with an entity reaching the end of a data segment of an assigned sub-buffer. In certain embodiments, the processing of FIG. 10 is performed by the entity whenever the entity reaches the end of a current data segment within the assigned sub-buffer.

In block 1002, the management task of the entity calculates its own current utilization rate (CURx). In various embodiments, the utilization rate may be calculated in bytes/sec (or any preferred time unit) for the data segment.

$$CURx=\text{size of (data segment)}/(\text{Data Segment End Timestamp}-\text{Data Segment Begin Timestamp})$$

Merely to enhance understanding an example of calculating a current utilization rate CURx is provided herein. For this example, the size of a data segment=100 bytes, Data Segment Begin Timestamp=0 hr 0 min 55 seconds 000 milliseconds (i.e.: exactly 55 seconds after midnight), and Data Segment End Timestamp=0 hr 0 min 59 seconds 000 milliseconds (i.e.: exactly 59 seconds after midnight). Then, the current utilization rate (CURx) is:

$$CURx=100 \text{ bytes}/(59 \text{ seconds}-55 \text{ seconds})$$

$$=(100 \text{ bytes})/(4 \text{ seconds})$$

$$=25 \text{ bytes/seconds}$$

With embodiments, there may be conversion of the current utilization rate CURx into different time units. For example, for the conversion into bytes/minutes, the conversion would be: 25 bytes/seconds*60 seconds/minute=1500 bytes/min.

In block 1004, the management task of the entity reports (stores) both the entity's own current utilization rate CURx and an expiration date of the current utilization rate CURx to each other entity. The expiration date of the current utilization rate CURx is a time by which the given value of the current utilization rate CURx is to be used. If the current utilization rate CURx is read after the time specified by the expiration date, the value of the current utilization rate CURx is no longer valid. In certain embodiments, the management task of each entity reports by storing the current utilization rate CURx and the expiration date associated with that value of the current utilization rate CURx in a common data structure that the management tasks of the other entities can access and read. In certain embodiments, the management task reports both the current utilization rate CURx and the expiration date, overwriting any preceding report. In certain embodiments, the management task makes a new report before the expiration date of any previous report expires as there is a well calibrated viability period. In certain embodiments, if a given management task of an entity is too slow to achieve that, a 0/sec utilization is safe to assume as no sub-buffer would ever be bereft of all of its data segments.

In block 1006, the management task sums up each utilization rate (CURx) of the entity and each other entity.

$$\Sigma(CURx) \text{ where } x \text{ goes from } [1 \ldots N]$$

Merely to enhance understanding an example of calculating utilization rates is provided herein. With this example, there are 4 entities, at time 12:12:00 (exactly 12 minutes after noon):

CUR1=25 bytes/second, and the expiration date for CUR1 is 12:12:05 (CUR1 is valid since time is not yet passed)

CUR2=300 bytes/second, and the expiration date for CUR2 is 12:11:59 (already expired; thus, CUR2 is invalid)

CUR3=20 bytes/second, and the expiration date for CUR3 is 12:12:10 (CUR3 is valid since time is not yet passed)

CUR4=55 bytes/second, and the expiration date for CUR4 is 12:12:15 (CUR4 is valid since time is not yet passed)

Then, Sum(CURx)=25+0+20+55=100 bytes/second was written by all the entities. For this example, since the value of CUR2 expired, zero was used in place of the reported value of CUR2.

In block 1008, the management task determines a number of data segments for the entity based on its current utilization rate relative to the utilization rate of each of the other entities (i.e., based on its utilization relative to the utilization of the other entities). In various embodiments, various techniques may be used to determine this. For example, percentage utilization or statistical distribution may be used to determine the number of data segments for the entity.

With percentage utilization, the management task calculates the percentage utilization (% U) of each entity Ex by dividing an entity's own current utilization rate CURx by the sum of the utilization rates multiplied by 100.

$$\% Ux=(CURx/\Sigma(CURx))*100\%$$

With percentage utilization, the number of data segments that the the sub-buffer SBx is entitled to is the equivalent percentage of Z.

$$NumSegFor(SBx)=\%Ux*Z/100 \text{ segments}$$

With statistical distribution, the management task calculates mean, variance, and sigma using the utilization rates of the entities. If an entity's current utilization rate CURx falls within +/−sigma, the sub-buffer SBx is allowed Z/N segments. If as the entity's current utilization rate CURx moves away from the mean, let's say p*sigma, then the sub-buffer SBx is allowed $Z/N+(p/|P|*(|p|-1))$ segments (i.e., allowed +/−one data segment less than the number of sigma way from the mean.)

In block 1010, the management task adjusts a size of the assigned sub-buffer based on the determination.

With embodiments, the management task may add or remove a predetermined maximum number of data segments to/from a sub-buffer to prevent unnecessary oscillation or resonance. For example, in certain embodiments, at most 1 segment is added to a sub-buffer at any given time and at most 2 segments are removed from a sub-buffer at any given time.

With embodiments, at any moment, all the system traces may be retrieved and sorted by time (based on a timestamp), entity/group ID, thread ID, process ID, and/or Central Processing Unit (CPU) ID by collecting the contents of all the data segments, whether each data segment is assigned to a sub-buffer or is on the free list. With various embodiments, each trace entry may, in addition to data pertinent to the current code execution, record the current timestamp, the entity/group ID, the thread ID, the process ID, and/or the CPU ID.

Figure 11A:
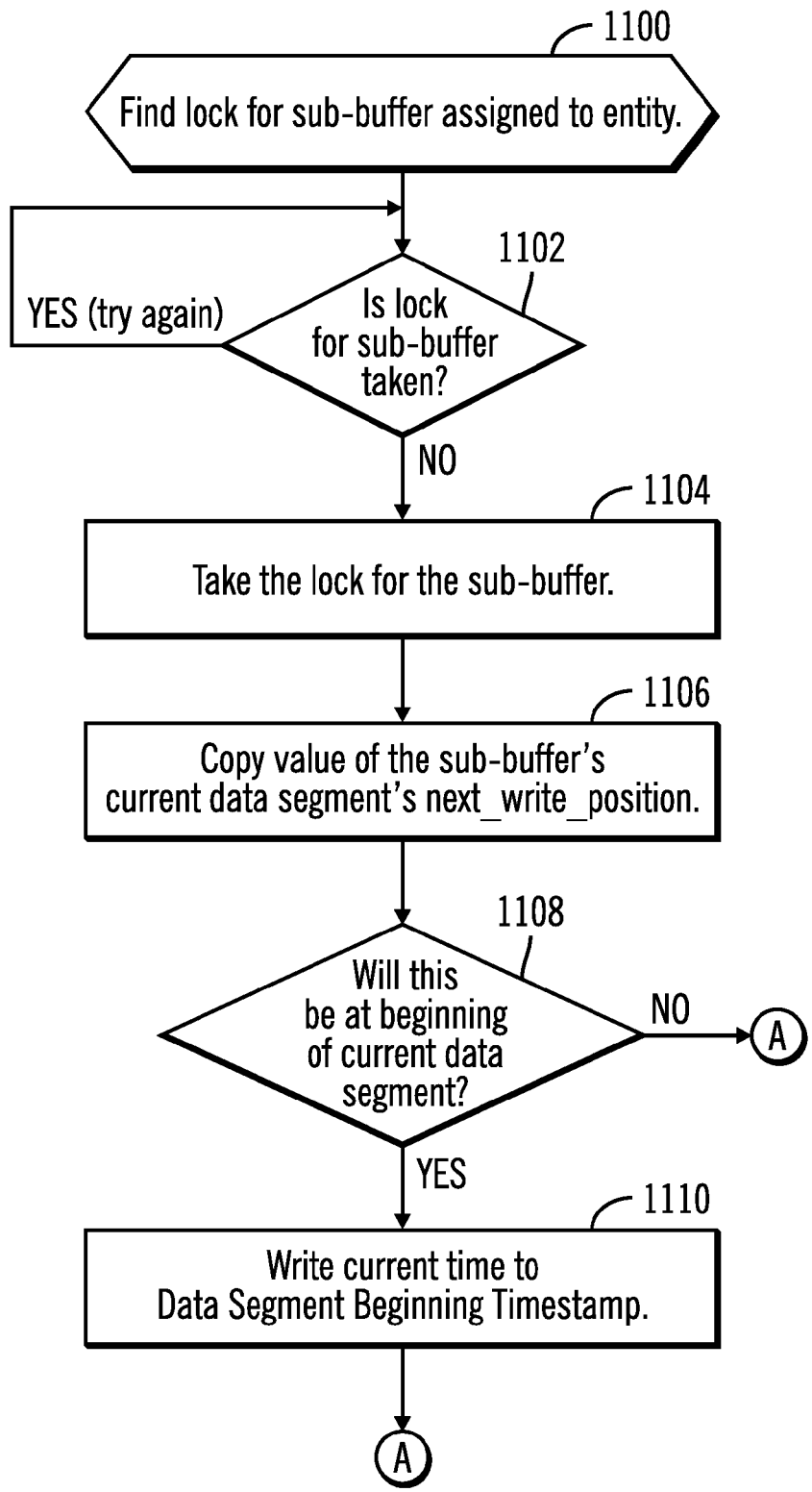
FIGS. 11A, 11B, and 11C illustrate, in a flowchart, operations performed for a trace in accordance with certain embodiments.
Figure 11B:
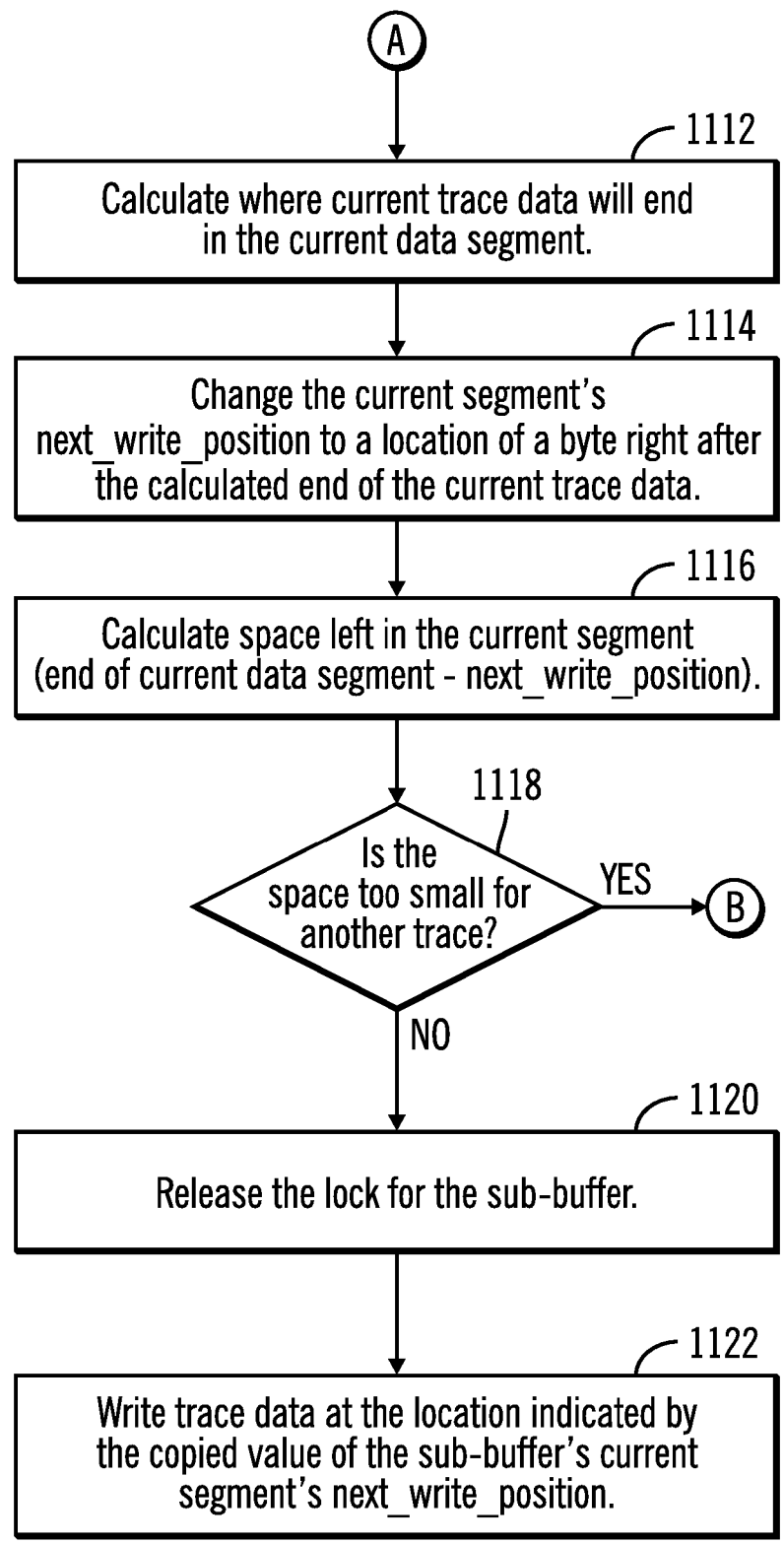
Figure 11C:
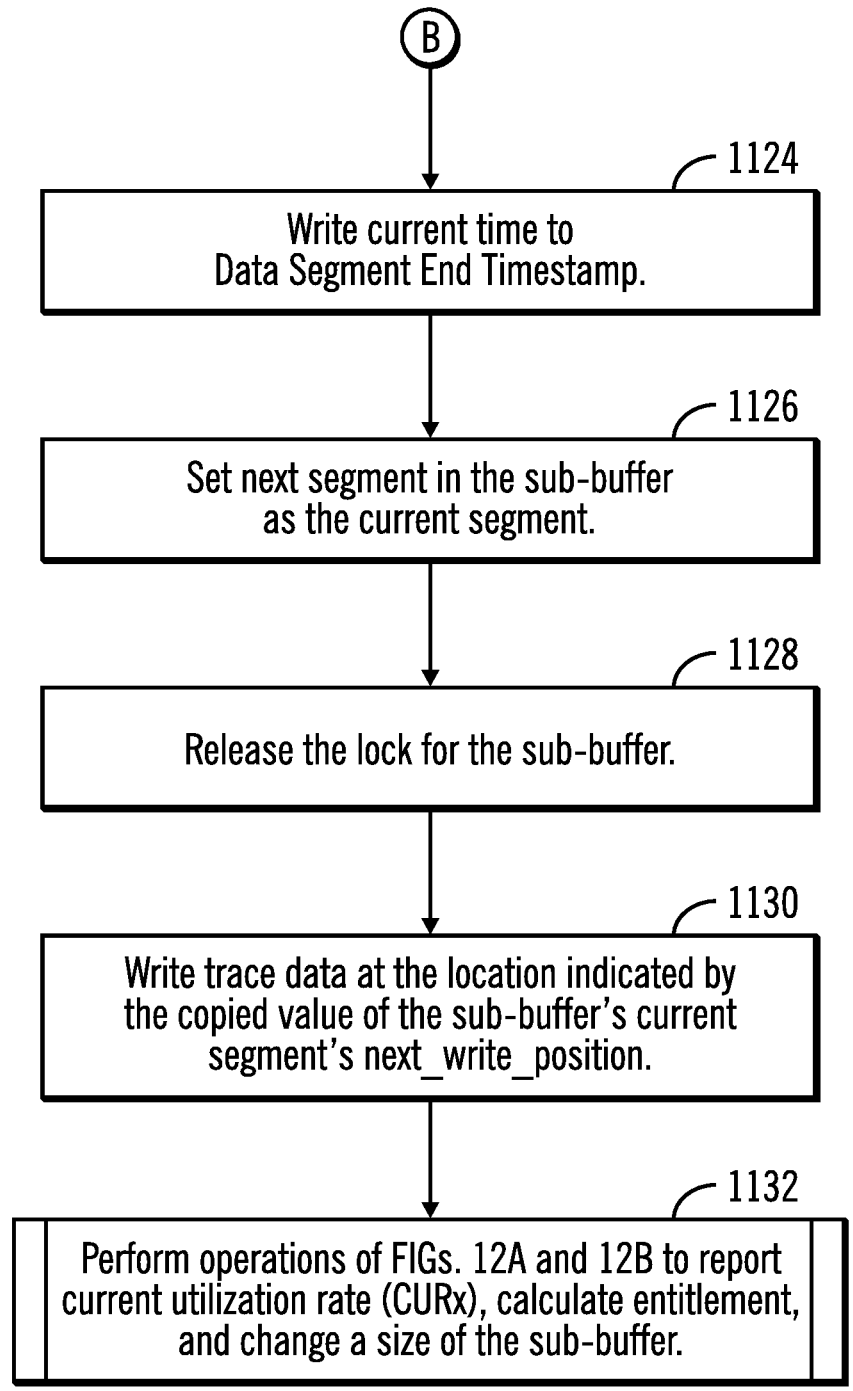

FIGS. 11A, 11B, and 11C illustrate, in a flowchart, operations performed for a trace in accordance with certain embodiments. Each entity performs the operations of FIG. 4. Control begins at block 1100 with the management task of the entity finding a lock for a sub-buffer assigned to the entity. In block 1102, the management task determines whether the lock for the sub-buffer has been taken by another entity. If so, processing continues to loop until the lock is obtained, otherwise, processing continues to block 1104.

In block 1104, the management task takes the lock for the sub-buffer. In block 1106, the management task copies a value of the sub-buffer's current data segment's next_write_position. In block 1108, the management task determines whether this will be at the beginning of a current data segment. If so, processing continues to block 1110, otherwise, processing continues to block 1112 (FIG. 11B). In block 1110, the management task writes a current time to the data segment beginning timestamp. From block 1110 (FIG. 11A), processing continues to block 1112 (FIG. 11B).

In block 1112, the management task calculates where current trace data will end in the current data segment. In block 1114, the management task changes the current data segment's next_write_position to a location of a byte right after the calculated end of the current trace data.

In block 1116, the entity calculates space left in the current data segment (end of current data segment−next_write_position). In block 1118, the entity determines whether the space is too small for another trace. If so, processing continues to block 1124 (FIG. 11C), otherwise, processing continues to block 1120.

In block 1120, the management task releases the lock for the sub-buffer. In block 1122, the management task writes trace data at the location indicated by the copied value of the sub-buffer's current data segment's next_write_position.

In block 1124, the management task writes a current time to data segment end timestamp. In block 1126, the management task sets a next data segment in the sub-buffer as the current data segment. In block 1128, the management task releases the lock for the sub-buffer. In block 1130, the management task writes trace data at the location indicated by the copied value of the sub-buffer's current data segment's next_write_position.

Figure 12A:
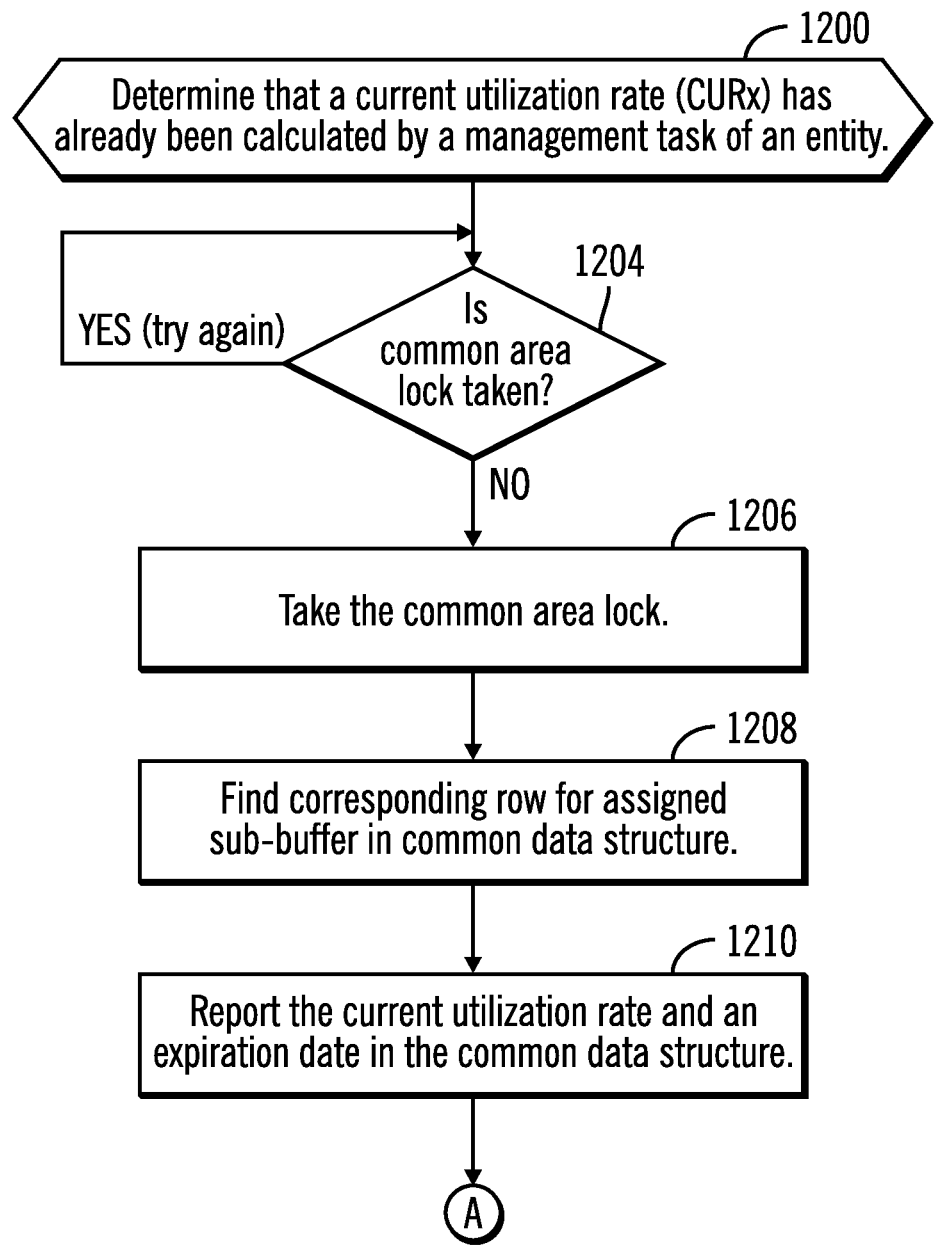
FIGS. 12A and 12B illustrate, in a flowchart, operations for reporting of current utilization rates, calculation of data segment entitlement for an assigned sub-buffer, and changing of a size of the assigned sub-buffer in accordance with certain embodiments.
Figure 12B:
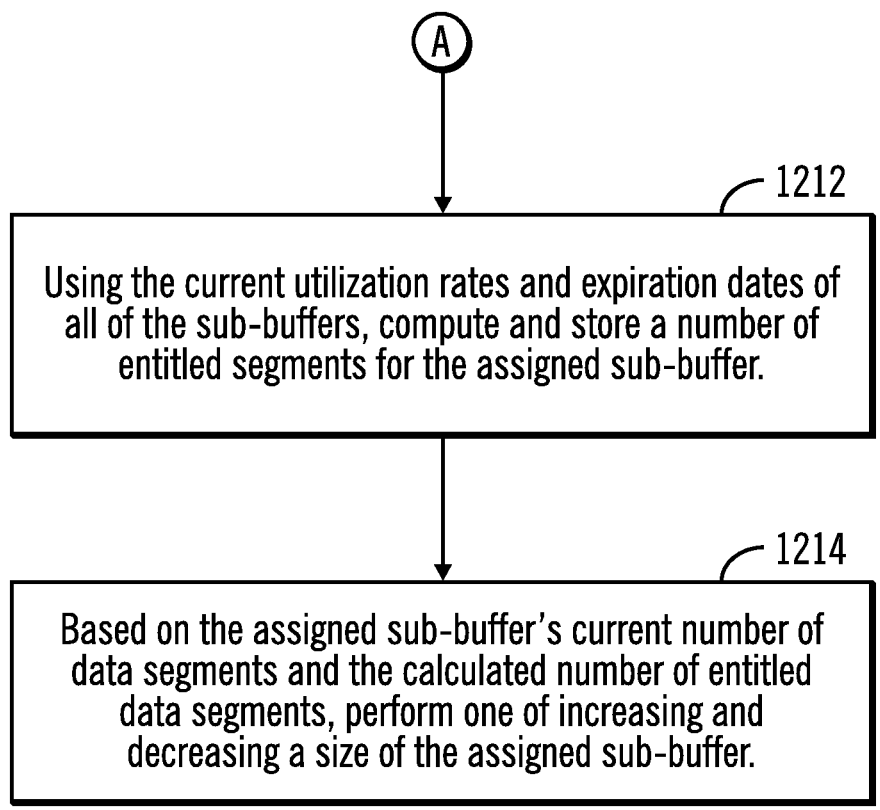

In block 1132, the management task performs operations of FIGS. 12A and 12B to report current utilization CURx, calculate entitlement, and change a size of the sub-buffer.

FIGS. 12A and 12B illustrate, in a flowchart, operations for reporting of current utilization rates, calculation of data segment entitlement for an assigned sub-buffer, and changing of a size of the assigned sub-buffer in accordance with certain embodiments. Control begins at block 1200 with the management task of an entity (e.g., a tracing thread) determining that a current utilization rate (CURx) has already been calculated by the management task of the entity. In block 1204, the management task determines whether the common area lock is taken. If so, processing continues to loop until the lock is obtained, otherwise, processing continues to block 1206.

In block 1206, the management task takes the common area lock. In block 1208, the management task finds a corresponding row for the assigned sub-buffer in a common area structure (e.g., the sub-buffer information and statistics 800). In block 1210, the management task reports (stores) the current utilization rate and an expiration date in the common data structure. From block 1210 (FIG. 12A), processing continues to block 1212 (FIG. 12B).

In block 1212, the management task, using the current utilization rates and expiration dates of all of the sub-buffers, computes and stores a number of entitled segments for the assigned sub-buffer. In block 1214, the management task, based on the assigned sub-buffer's current number of data segments and the calculated number of entitled data segments, performs one of increasing and decreasing a size of the assigned sub-buffer.

Figure 13A:
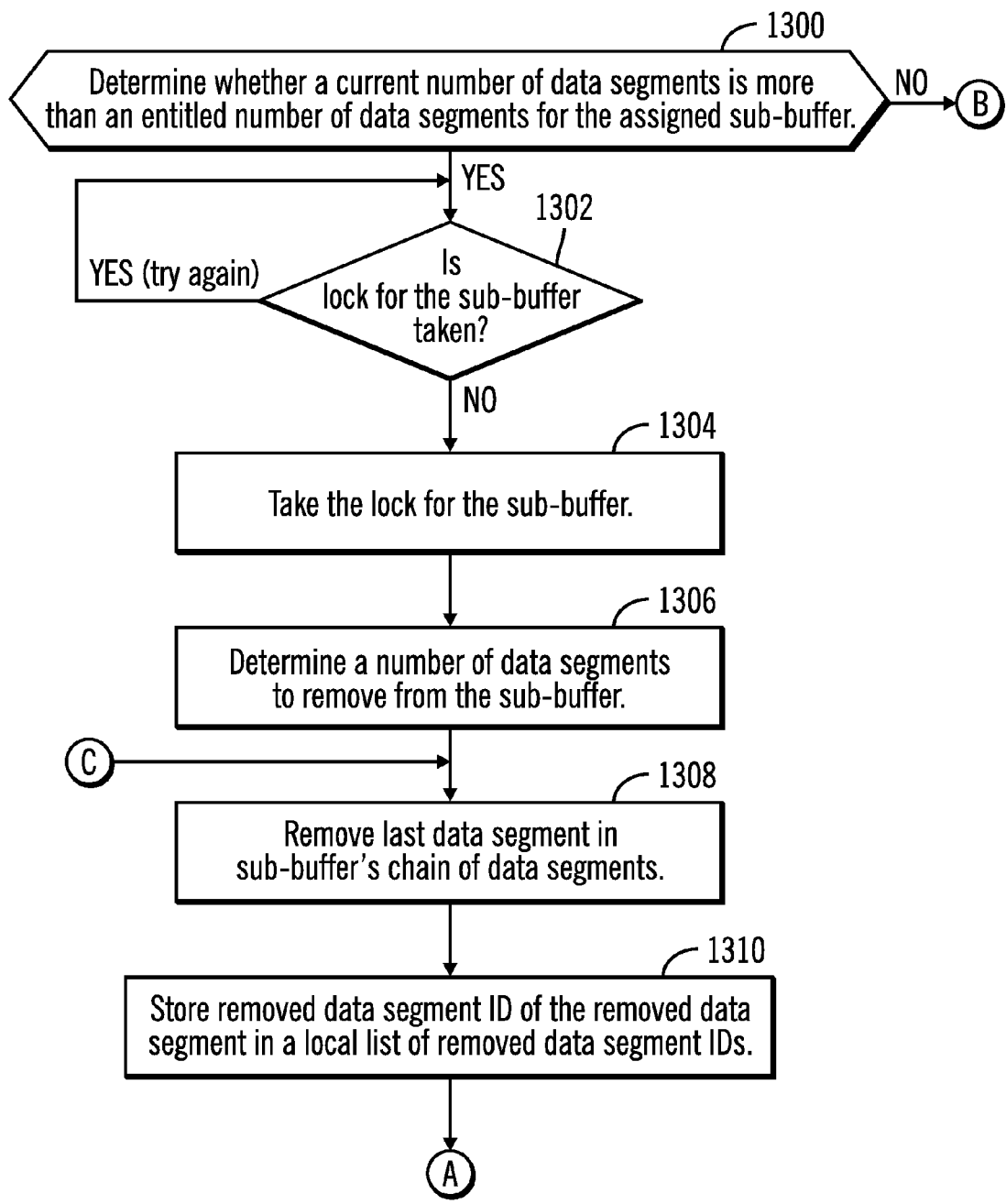
FIGS. 13A, 13B, 13C, and 13D illustrate, in a flowchart, operations for adjusting a size of a sub-buffer in accordance with certain embodiments.
Figure 13B:
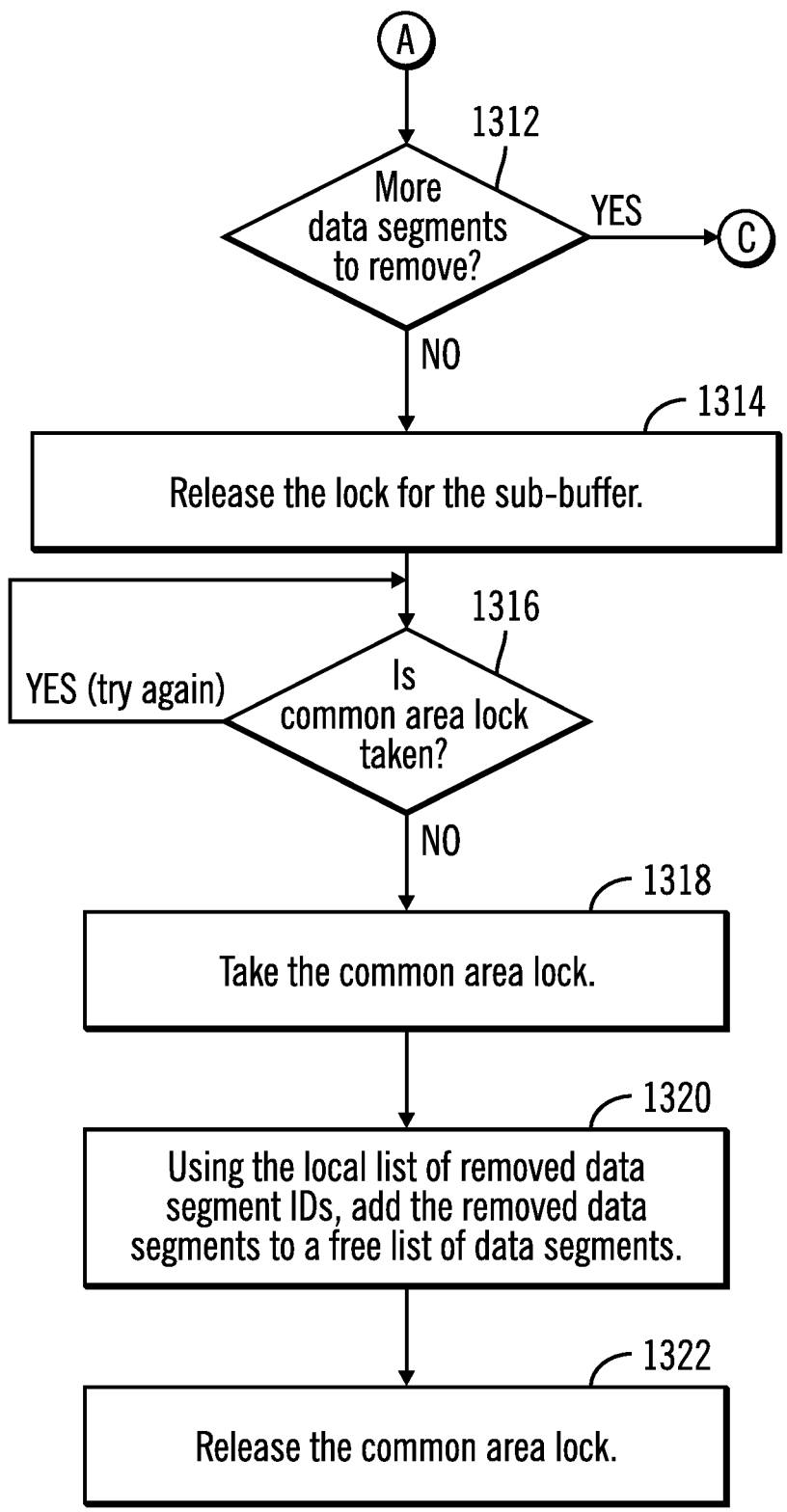
Figure 13C:
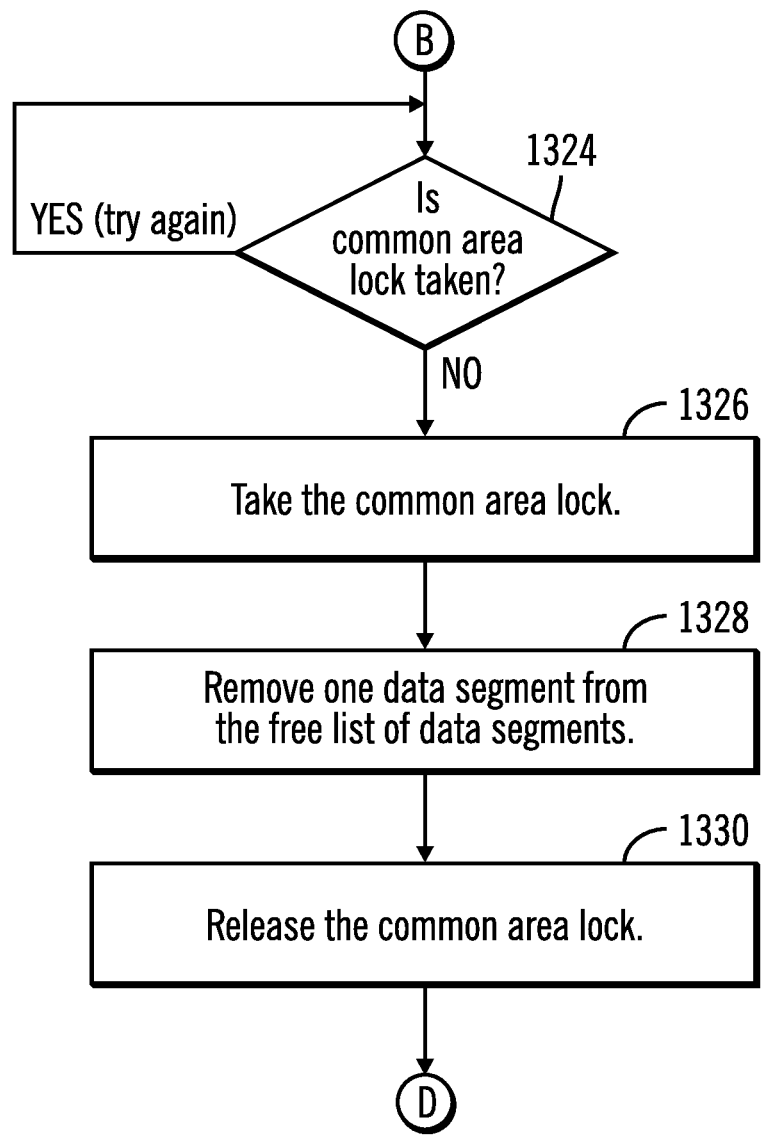

FIGS. 13A, 13B, 13C, and 13D illustrate, in a flowchart, operations for adjusting a size of a sub-buffer in accordance with certain embodiments. Control begins at block 1300 with the management task determining whether a current number of data segments is more than an entitled number of data segments for the assigned sub-buffer. If so, processing continues to block 1302, otherwise, processing continues to block 1324 (FIG. 13C).

In block 1302, the management task determines whether the lock for the sub-buffer has been taken. If so, processing continues to loop until the lock is obtained, otherwise, processing continues to block 1304.

In block 1304, the management task takes the lock for the sub-buffer. In block 1306, the management task determines a number of data segments to remove from the sub-buffer. In block 1308, the management task removes last data segment in sub-buffer's chain of data segments. In block 1310, the management task stores a removed data segment ID of the removed data segment in a local list of removed data segment IDs. From block 1310, processing continues to block 1312 (FIG. 13B).

In block 1312, the management task determines whether there are more data segments to remove. If so, processing continues to block 1308, otherwise, processing continues to block 1314. In block 1314, the management task releases the lock for the sub-buffer.

In block 1316, the management task determines whether the common area lock is taken. If so, processing continues to loop until the lock is obtained, otherwise, processing continues to block 1318. In block 1318, the management task takes the common area lock. In block 1320, the management task, using the local list of removed data segment IDs, adds the removed data segments to a free list of data segments. In block 1322, the management task releases the common area lock.

Figure 13D:
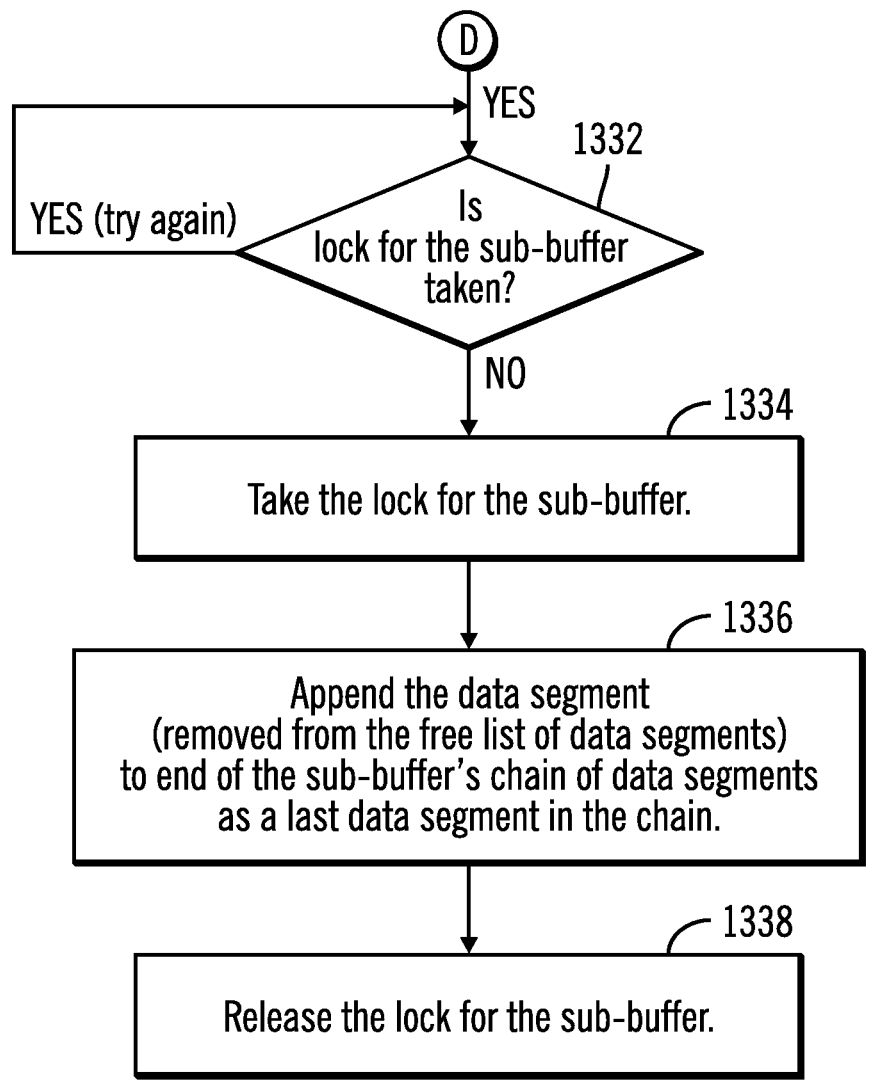

In block 1300, if it was determined that the current number of data segments is less than the entitled number of data segments for the assigned sub-buffer, processing continues to block 1324. In block 1324, the management task determines whether the common area lock is taken. If so, processing continues to loop until the lock is obtained, otherwise, processing continues to block 1326. In block 1326, the management task takes the common area lock. In block 1328, the management task removes one data segment from the free list of data segments. In block 1330, the management task releases the common area lock. From block 1330 (FIG. 13C), processing continues to block 1332 (FIG. 13D).

In block 1332, the management task determines whether the lock for the sub-buffer has been taken. If so, processing continues to loop until the lock is obtained, otherwise, processing continues to block 1334. In block 1334, the management task takes the lock for the sub-buffer. In block 1336, the management task appends the data segment (removed from the free list of data segments) to the end of the sub-buffer's chain of data segments as a last data segment in the chain. In block 1338, the management task releases the lock for the sub-buffer.

Certain embodiments are directed to tracing in a computing device, where multiple entities share a buffer of non-equal sized circular sub-buffers. Each of multiple entities reports when that entity finishes using a data segment. Then, a utilization rate is calculated, and the data segments within the shared buffer are adjusted based on the percentage of utilization or the standard deviation of the utilization rate.

With embodiments, the data segments are dynamically allocated to sub-buffers without the use of a central management thread. That is, each entity (thread) determines the allocation.

With embodiments, each management task of each entity determines its own utilization rate, determines the number of data segments that it is entitled to, and adjusts the size of its own sub-buffer. Thus, embodiments provide self-calibrated dynamic adjustment management.

Embodiments allocate sub-buffers made of blocks of memory to threads that need to use them. With embodiments, those sub-buffers are used as circular buffers, and those sub-buffers are resized when skews are found between the threads utilization of the allocated resources.

Certain embodiments use random memory blocks (segments) from a big shared buffer to make the sub-buffers. With that infrastructure in place, data segments may be taken from any under-utilized sub-buffer to complement a heavily utilized one.

Figure 14:
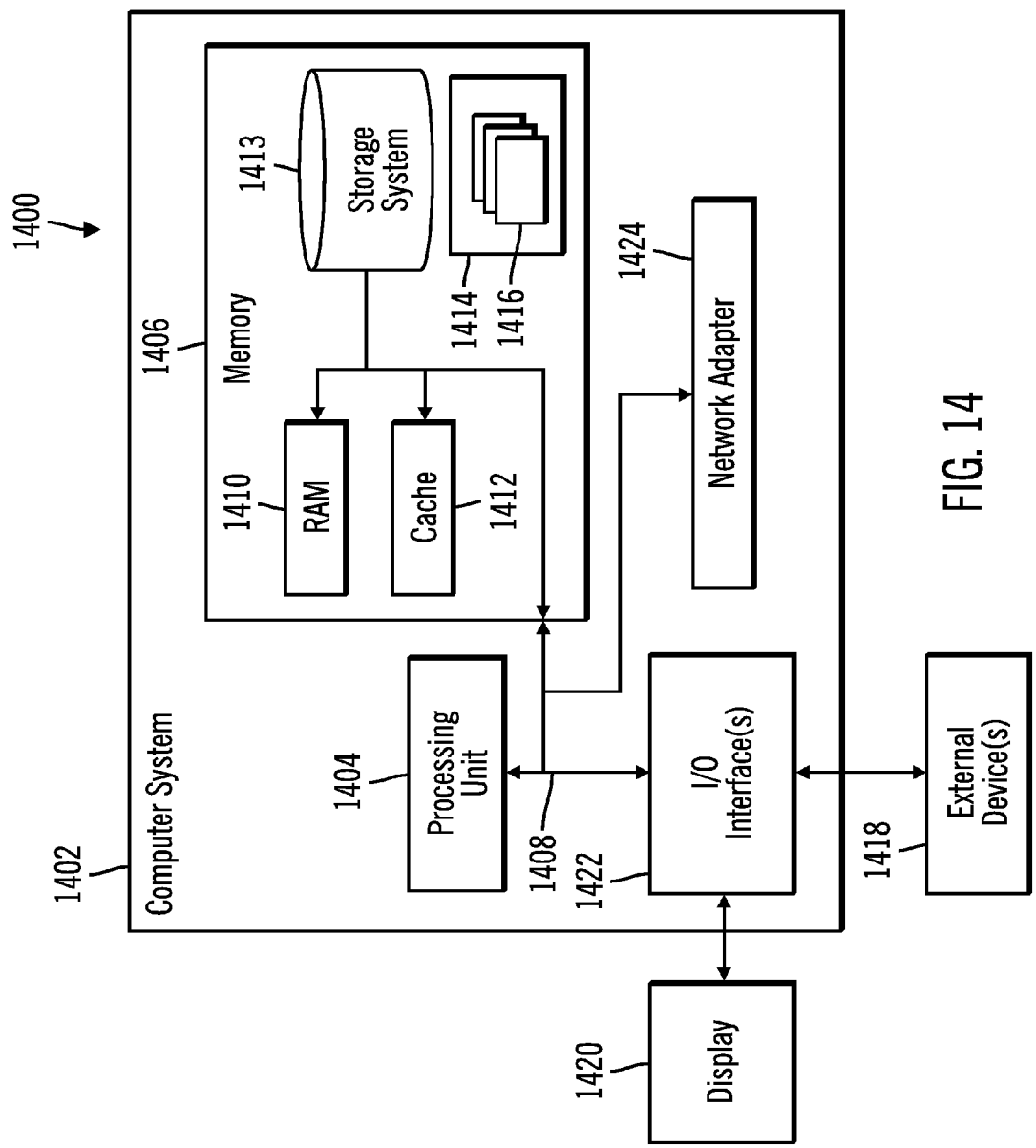
FIG. 14 illustrates a computing architecture in which the components of FIG. 1 may be implemented.

FIG. 14 illustrates a computing architecture in which the components of FIG. 1 may be implemented. In certain embodiments, computing device 100 may implement computer architecture 1400.

Computer system/server 1402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1402 may be practiced in distributed cloud computing environments where tasks are performed by remote processing devices that are linked through a communications network. In a distributed cloud computing environment, program modules may be located in both local and remote computer system storage media including memory storage devices.

Certain embodiments are directed to dynamically changing the size/allocation of data segments of a shared main buffer allocated to multiple threads/processes based on the utilization rate of the data segments.

With embodiments, the management task is able to assign random data segments from the shared main buffer to the sub-buffers. With that infrastructure in place, data segments may be taken from any underutilized sub-buffer to complement a heavily utilized sub-buffer. With embodiments, data segments may be transferred between the sub-buffers.

As shown in FIG. 14, the computer system/server 1402 is shown in the form of a general-purpose computing device. The components of computer system/server 1402 may include, but are not limited to, one or more processors or processing units 1404, a system memory 1406, and a bus 1408 that couples various system components including system memory 1406 to processor 1404. Bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1402 typically includes a variety of computer system readable media. Such media may be any available media that is accessible by computer system/server 1402, and it includes both volatile and non-volatile media, removable and non-removable media.

System memory 1406 can include computer system readable media in the form of volatile memory, such as random access memory (RAM) 1410 and/or cache memory 1412. Computer system/server 1402 may further include other removable/non-removable, volatile/non-volatile computer system storage media. By way of example only, storage system 1413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1408 by one or more data media interfaces. As will be further depicted and described below, memory 1406 may include at least one program product having a set (e.g., at least one) of program modules that are configured to carry out the functions of embodiments of the invention.

Program/utility 1414, having a set (at least one) of program modules 1416, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. The components of the computer 1402 may be implemented as program modules 1416 which generally carry out the functions and/or methodologies of embodiments of the invention as described herein. The systems of FIG. 1 may be implemented in one or more computer systems 1402, where if they are implemented in multiple computer systems 1402, then the computer systems may communicate over a network.

Computer system/server 1402 may also communicate with one or more external devices 1418 such as a keyboard, a pointing device, a display 1420, etc.; one or more devices that enable a user to interact with computer system/server 1402; and/or any devices (e.g., network card, modem, etc.) that enable computer system/server 1402 to communicate with one or more other computing devices. Such communication can occur via Input/Output (I/O) interfaces 1422. Still yet, computer system/server 1402 can communicate with one or more networks such as a local area network (LAN), a general wide area network (WAN), and/or a public network (e.g., the Internet) via network adapter 1424. As depicted, network adapter 1424 communicates with the other components of computer system/server 1402 via bus 1408. It should be understood that although not shown, other hardware and/or software components could be used in conjunction with computer system/server 1402. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a non-transitory computer readable storage medium having program code embodied therewith, the program code executable by at least one processor to perform operations, the operations comprising:
   assigning a different sub-buffer that is allocated one or more data segments to each entity of multiple entities; and
   under control of each of the multiple entities, in response to reaching an end of a data segment of the one or more data segments, re-sizing the assigned sub-buffer by:
      reporting a current utilization rate of the entity and an expiration date of the current utilization rate;
      generating a summed value by summing up the current utilization rate of the entity and a current utilization rate of each other entity with a valid expiration date;
      determining a number of data segments for the entity based on the current utilization rate of the entity relative to the current utilization rate of the multiple entities using the summed value;
      adjusting a size of the assigned sub-buffer based on the determination by one of allocating a new data segment to the assigned sub-buffer and removing an existing data segment from the assigned sub-buffer, wherein at least two of the multiple entities has a different size sub-buffer based on different current utilization rates; and
      using the adjusted, assigned sub-buffer.

2. The computer program product of claim 1, wherein each entity is any user of the assigned sub-buffer.

3. The computer program product of claim 1, wherein the determination is based on a percentage utilization.

4. The computer program product of claim 1, wherein the determination is based on a statistical distribution.

5. The computer program product of claim 1, wherein the program code is executable by the at least one processor to perform operations, the operations further comprising:
   dividing a main buffer into data segments, wherein each different sub-buffer is allocated one or more of the data segments.

6. The computer program product of claim 1, wherein the program code is executable by the at least one processor to perform operations, the operations further comprising:
   storing a common area lock for use in accessing common area structures.

7. The computer program product of claim 1, wherein each entity is utilizing the assigned sub-buffer.

8. A computer system, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more memories, to perform operations, the operations comprising:
      assigning a different sub-buffer that is allocated one or more data segments to each entity of multiple entities; and
      under control of each of the multiple entities, in response to reaching an end of a data segment of the one or more data segments, re-sizing the assigned sub-buffer by:
         reporting a current utilization rate of the entity and an expiration date of the current utilization rate;
         generating a summed value by summing up the current utilization rate of the entity and a current utilization rate of each other entity with a valid expiration date;
         determining a number of data segments for the entity based on the current utilization rate of the entity relative to the current utilization rate of the multiple entities using the summed value;
         adjusting a size of the assigned sub-buffer based on the determination by one of allocating a new data segment to the assigned sub-buffer and removing an existing data segment from the assigned sub-buffer, wherein at least two of the multiple entities has a different size sub-buffer based on different current utilization rates; and
         using the adjusted, assigned sub-buffer.

9. The computer system of claim 8, wherein each entity is any user of the assigned sub-buffer.

10. The computer system of claim 8, wherein the determination is based on a percentage utilization.

11. The computer system of claim 8, wherein the determination is based on a statistical distribution.

12. The computer system of claim 8, wherein the operations further comprise:
   dividing a main buffer into data segments, wherein each different sub-buffer is allocated one or more of the data segments.

13. The computer system of claim 8, wherein the operations further comprise:
   storing a common area lock for use in accessing common area structures.

14. The computer system of claim 8, wherein each entity is utilizing the assigned sub-buffer.

15. A method, comprising:
   assigning, with a processor of a computer, a different sub-buffer that is allocated one or more data segments to each entity of multiple entities; and
   under control of each of the multiple entities, in response to reaching an end of a data segment of the one or more data segments, re-sizing the assigned sub-buffer by:
      reporting a current utilization rate of the entity and an expiration date of the current utilization rate;
      generating a summed value by summing up the current utilization rate of the entity and a current utilization rate of each other entity with a valid expiration date;
      determining a number of data segments for the entity based on the current utilization rate of the entity relative to the current utilization rate of the multiple entities using the summed value;
      adjusting a size of the assigned sub-buffer based on the determination by one of allocating a new data segment to the assigned sub-buffer and removing an existing data segment from the assigned sub-buffer, wherein at least two of the multiple entities has a different size sub-buffer based on different current utilization rates; and
      using the adjusted, assigned sub-buffer.

16. The method of claim 15, wherein each entity is any user of the assigned sub-buffer.

17. The method of claim 15, wherein the determination is based on a percentage utilization.

18. The method of claim 15, wherein the determination is based on a statistical distribution.

19. The method of claim 15, further comprising:
dividing a main buffer into data segments, wherein each different sub-buffer is allocated one or more of the data segments.

20. The method of claim 15, further comprising:
storing a common area lock for use in accessing common area structures.

* * * * *